United States Patent [19]
Gruber

[11] Patent Number: 5,505,566
[45] Date of Patent: Apr. 9, 1996

[54] POWDER INJECTOR

[75] Inventor: Johann Gruber, Rebstein, Switzerland

[73] Assignee: Wagner International AG, Altstaetten, Switzerland

[21] Appl. No.: 7,679

[22] Filed: Jan. 22, 1993

[30] Foreign Application Priority Data

Jan. 22, 1992 [DE] Germany .......................... 42 01 665.7

[51] Int. Cl.⁶ .................................................. B65G 53/66
[52] U.S. Cl. ............................ 406/12; 406/93; 406/153; 137/110; 137/892
[58] Field of Search .................................. 406/10, 12, 14, 406/93, 94, 108, 141, 142, 143, 144, 151, 152, 153; 137/110, 890, 892

[56] References Cited

U.S. PATENT DOCUMENTS

| | | | |
|---|---|---|---|
| 3,901,184 | 8/1975 | Payne et al. | 118/629 |
| 4,114,810 | 9/1978 | Masuda | 239/706 |
| 4,615,649 | 10/1986 | Sharpless | 406/142 X |
| 4,759,504 | 7/1988 | Woodward | 137/110 X |
| 4,775,105 | 10/1988 | Rese | 239/704 |
| 4,941,778 | 7/1990 | Lehmann | 406/28 |
| 5,271,695 | 12/1993 | Bischof et al. | 406/153 X |

FOREIGN PATENT DOCUMENTS 3721875  1/1989  Germany .

*Primary Examiner*—David M. Mitchell
*Assistant Examiner*—Andrew C. Pike
*Attorney, Agent, or Firm*—Hill, Steadman & Simpson

[57] ABSTRACT

A powder injector creates a powder-air mixture and feeds the mixture to a powder coating gun. The injector comprises a powder suction conduit, an injector nozzle fitted in the powder suction conduit, a mixing cone with a venturi tube connected thereto, the mixing cone being disposed downstream of the injector nozzle, a conveying air supply conduit including a control valve for feeding conveying air to the injector nozzle, and a metering air supply conduit for feeding metering air to metering air outlet ports opening into the venturi tube. The metering air supply conduit is composed of two parallel branch passageways branching off the conveying air supply conduit and opening into a common supply conduit leading to the metering air outlet ports. One of the two branch passageways has a metering air control valve disposed therein which is actuated by the air pressure prevailing in the conveying air supply conduit.

20 Claims, 2 Drawing Sheets

POWDER INJECTOR

BACKGROUND OF THE INVENTION

The present invention is directed to a powder injector for forming a mixture of powder and air and feeding the mixture to a powder coating gun. Particularly, the present invention relates to a powder injector for forming a powder-air mixture wherein the powder injector comprises a powder suction conduit, an injector inserted in said powder suction conduit, a venturi tube connected thereto, the venturi tube being provided downstream of the injector, a conveying air supply conduit having a control valve therein for feeding conveying air to the injector, and a control air supply conduit for feeding control air to control air ports opening into the venturi tube. Powder injectors of this type are known and are being used in powder coating plants. Such powder injectors are disclosed in German Patent DE 37 21 875 A1 and corresponding U.S. Pat. No. 4,941,778 herein incorporated by reference.

In the known powder injector of the specified kind, conveying air and control air or "metering" air are set or adjusted independently of one another by the user by means of control valves associated with the conveying air supply conduit and the control air supply conduit. Adjustment of the conveying air will cause a variation of the powder quantity which is drawn in and conveyed to the coating gun and also of the flow rate of the powder-air mixture in the supply conduit to the powder coating gun. In addition to the conveying air, the metering air affects the powder concentration in the powder-air mixture and, above all, the velocity of the powder-air mixture in the supply conduit leading to the coating gun.

It is generally known that for a small quantity of conveying air and hence a low conveying air pressure, i.e., when small powder quantities are required, increased amounts of metering air and hence a higher metering air pressure are required because otherwise the velocity of the powder-air mixture in the supply conduit to the coating gun will be too low. An inadequate velocity results in the precipitation of powder from the mixture, non-uniform concentration, and the occurrence of pulsations. On the other hand, for medium pressures of conveying air, comparatively little metering air is required, and for higher pressures of conveying air a constant basic quantity of metering air will suffice.

As described above, the conveying air and metering air are set or adjusted independently of each other by the user, that is, the user initially sets the conveying air in such a way as to cause conveying of the desired powder quantity whereupon the metering air quantity is set "intuitively" in a way deemed proper by the user in view of the predetermined conveying air quantity. An optimum relationship between the metering air quantity and the conveying air quantity can only rarely be achieved in this way, and there may also occur fluctuations in the conveying air pressure so that in operation the user will frequently have to readjust the metering air even though there is no variation in conveying air. Finally, such mutually independent setting and adjusting of conveying air and metering air is tedious and requires the manipulation of an experienced operator.

SUMMARY OF THE INVENTION

It is therefore the objective of the present invention to improve a powder injector of the above-specified kind such that the user need only perform a single setting or adjusting operation whereby the conveying air is set to the desired value while the ratio of conveying air quantity to metering air quantity is automatically determined so that optimum feeding of the powder-air mixture to the powder coating gun is ensured.

The objective is inventively achieved in that a powder injector is provided having a metering air supply conduit divided into two parallel metering air branch passageways, a first branch passageway and a second branch passageway. Each branch passageway branches off from the conveying air supply conduit at a location downstream of the conveying air control valve and opens into a common supply conduit flow connected to the metering air ports. Flow restricting orifice means are respectively inserted in either of said branch passageways, and one of the branch passageways has a metering air control valve disposed therein for controlling the flow cross section thereof, the control valve being actuated by the pressure prevailing in the conveying air supply conduit downstream of the conveying air control valve.

With the powder injector in accordance with the present invention the user is merely required to set the control valve for the conveying air in accordance with the powder quantity necessary for the coating operation, and the metering air quantity will then automatically be matched with the set conveying air quantity. For any setting of the conveying air, a certain basic metering air quantity will always reach the metering air ports through the metering air branch passageway that has no valve provided therein, which basic quantity, while not being independent of the pressure of the conveying air, will increase only slightly with the latter. Through the second, valved metering air branch passageway additional metering air will reach the metering air ports when the valve passage is open. This is the case when the pressure of conveying air is comparatively low. But upon the conveying air pressure rising above a predetermined threshold level, the valve will start to close and will be fully closed at a predetermined second threshold level. In other words, it is automatically provided that for a small quantity of conveying air a relatively high quantity of metering air is supplied to the powder-air mixture while for a large quantity of conveying air a relatively low quantity of metering air will be supplied thereto, so that the appropriate metering air/conveying air ratio, dependent on the pressure of the conveying air, actually is obtained which is required in view of the coating results. Practical experiments have confirmed this fact and have shown that particularly for profiled work surfaces the coating quality is substantially higher than in the case of a separate manual setting of the conveying air and the metering air by an experienced skilled operator.

In a further development of the invention, the metering air control valve comprises a movable valve plunger for controlling the flow cross section in the branch passageway having the metering air control valve disposed therein, the plunger in its one direction of movement being loaded by a spring and in its other direction of movement being loaded by the pressure prevailing in the conveying air supply conduit.

An end face of the valve plunger of the metering air control valve can be arranged to project into the respective other branch passageway upstream of an orifice means installed into this respective other branch passageway.

The stroke of the valve plunger of the metering air control valve can be adapted and arranged to be adjusted by a regulating screw. The spring of the metering air control valve can be selected to exhibit a progressive characteristic.

In the drawing, embodiments of the invention are illustrated by way of example.

DETAILED DESCRIPTION OF THE PREFERRED EMBODIMENTS

Figure 1:
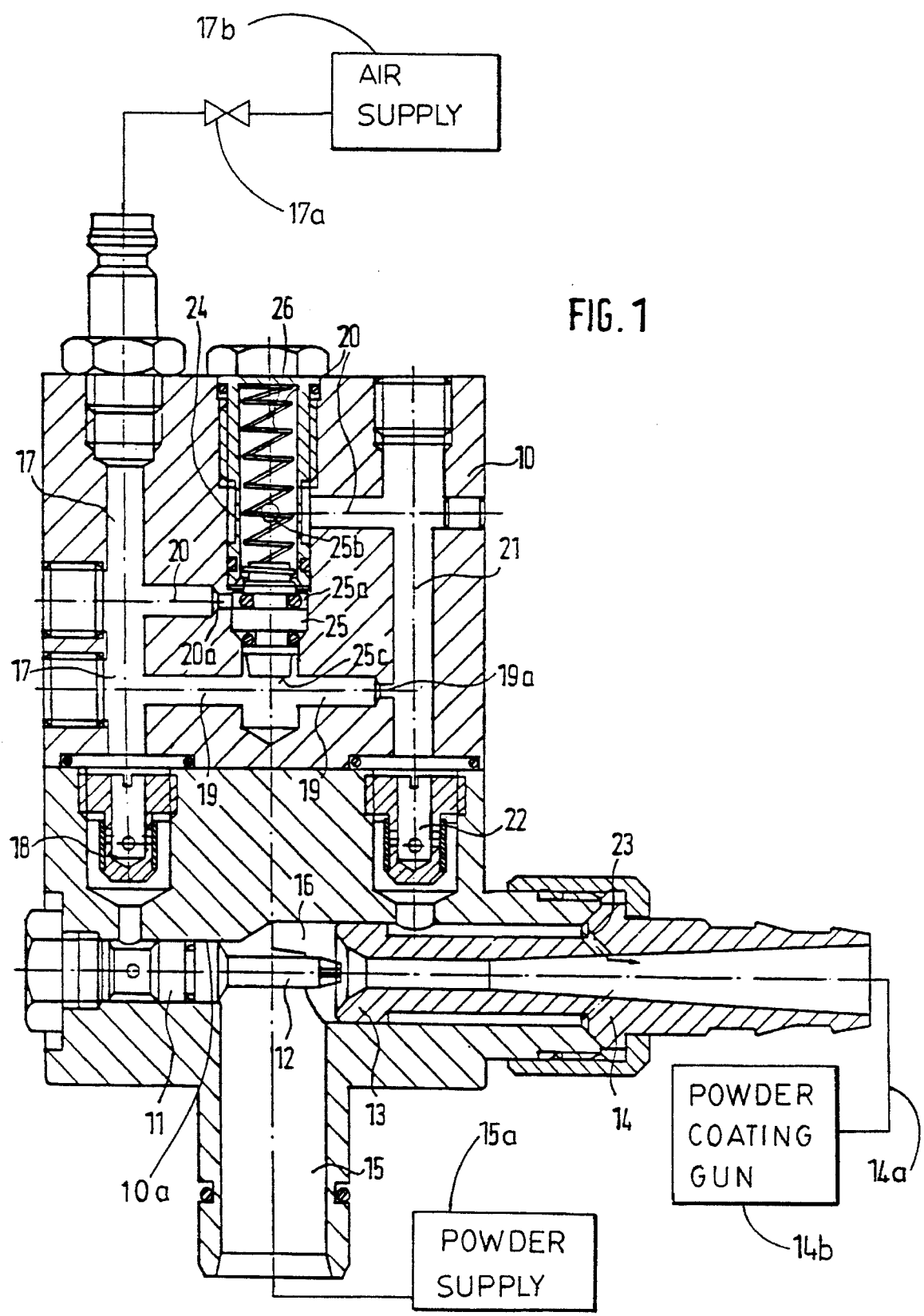
FIG. 1 is a vertical sectional view of the powder injector.

In the drawing, 10 indicates the housing. The lower portion of the housing 10 is provided with a transverse through-hole 10a into which a nozzle assembly 11, including an injector nozzle 12, is screwed from one side while the other side of the transverse hole 10a has a mixing cone 13 facing the injector nozzle 12 and a venturi tube 14 contiguous with the mixing cone fitted therein. The outlet from the venturi tube 14 is connected to a hose 14a which leads to the powder coating gun 14b (the hose and gun shown schematically) and through which the powder-air mixture is fed from the injector to the gun. From the bottom surface of the housing 10 a powder suction passage 15 extends into a vacuum chamber 16 which surrounds the injector nozzle 12 and constitutes the middle portion of the transverse through-hole 10a.

A vertical conveying air supply conduit 17 leads from the top of the housing 10 right to the nozzle assembly 11 of the injector nozzle 12 and provides for pressurized-air communication with the injector nozzle 12. Upstream of the nozzle assembly 11 a check valve 18 is disposed in the conveying air supply conduit 17. A conveying air control valve 17a which is disposed externally of the housing 10 is used for manually controlling the conveying air from a conveying air supply 17b.

Located in the interior of the housing 10, two branch passageways, a first metering air branch passageway 19 and a second metering air branch passageway 20, extend from the conveying air supply conduit 17. Both branch passageways 19, 20 open into a vertically extending metering air supply conduit 21 which extends via a check valve 22 to metering air discharge ports 23 opening into a diffusor-like expanded channel portion of the venturi tube 14. The first branch passageway 19 provides for direct communication between conveying air supply conduit 17 and metering air supply conduit 21 with the air flow rate being, however, limited to a predetermined value by orifice means 19a inserted therein. The second metering air branch passageway 20 does not lead directly to the metering air supply conduit 21 but has a control valve 24 fitted therein.

The metering air control valve 24 comprises a valve plunger 25 with an annular inlet groove 25a. The plunger is biased in a downward direction by a helical spring 26. The spring 26 urges the valve plunger 25 against an abutment, in which case the annular inlet groove 25a is in alignment with the through-bore of an orifice means 20a inserted into the second branch passageway 20. At the same time a valve outlet port 25b will be in alignment with the outlet-side portion of the second branch passageway 20. In other words, in the position of the valve 24 shown in the drawing, the pressurized air from the conveying air supply conduit 17 may flow via the second metering air branch passageway 20 to the metering air supply conduit 21.

The end face 25c of the valve plunger 25 projects sealingly into the first branch passageway 19 at a location upstream of the orifice means 20a (as seen in the direction of flow). This means that the conveying air pressure is applied to the end face 25c.

The powder injector operates as follows. When the nonillustrated conveying air control valve is opened, air under pressure will flow through the vertical conduit 17 downwards into the nozzle assembly 11 and right through the same into the injector nozzle 12 from which the air under pressure will exit at a high velocity in the direction of the mixing cone 13. The air under pressure which exits at a high velocity from the injector nozzle 12 will entrain air molecules from the immediate vicinity of the exit location resulting in a negative pressure being developed in the chamber 16 so that powder is sucked from a powder supply 15a (shown schematically) through the conduit 15 which will then be conveyed together with the pressurized air from the injector nozzle 12 as an air-powder mixture through the mixing cone 13 and the venturi tube 14 into the nonillustrated supply hose and further to the coating gun. At the same time, air under pressure flows from the conduit 17 through the branch passageway 19 and its orifice means 19a, into the metering air supply conduit 21, and on towards the metering air ports 23 whence it enters the stream of air-powder mixture to dilute and, above all, to accelerate the same.

Assuming that the pressure of conveying air within the conduit 17 is comparatively low, such as from 0.5 to 1.5 bar, and that therefore the pressure applied to the end face 25c of the valve plunger 25 will be insufficient for compression of the spring 26, air under pressure will additionally flow through the second branch passageway 20 including the valve 24 into the conduit 21 and on to the metering air outlet ports 23. Hence, the amount of metering air exiting from the ports 23 from the first branch passageway 19 will be increased by the amount of metering air passing through the second branch passageway 20. If, however, the pressure within the conveying air supply conduit 17 is increased by further opening of the nonillustrated conveying air control valve, the valve plunger 25 due to the pressure applied to the end face 25c thereof will be moved upwards against the action of the spring 26 so that initially the flow of air under pressure through the branch passageway 20 will be reduced and finally—with continued increase of the pressure of conveying air within the conduit 17—the passage will be completely blocked. Therefore, the amount of metering air exiting from the ports 23 due to the first branch passageway 19 will be supplemented less and less by the air under pressure flowing through the second branch passageway 20 until finally metering air will be supplied to the ports 23 only from the first branch passageway 19.

Proper dimensioning of the orifice means 19a and 20a in the valve path and of the resilient biasing of the valve 24 therefore make it possible that the metering air automatically follows a predetermined dependence ratio between conveying air and metering air so that the user merely has to set the respective optimum flow rate or pressure of the conveying air.

Figure 2:
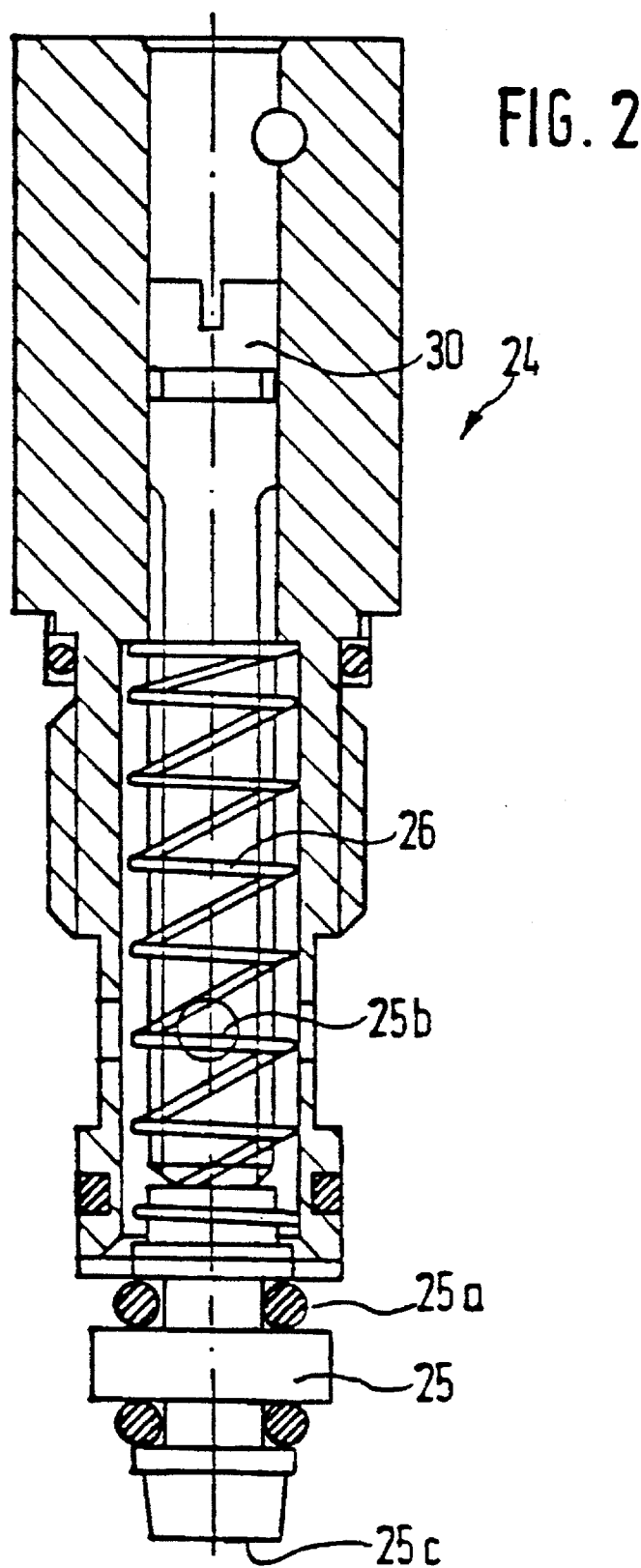
FIG. 2 is a vertical sectional view showing a modification of the metering valve.

FIG. 2 illustrates a modification of the metering valve 24 in which the stroke of the valve plunger 25 can be set by a regulating screw 30 adapted to be adjusted externally by means of a screwdriver such that even at a high pressure of conveying air the valve 24 will not completely close but a small annular passage will remain open. By this means the user may achieve adaptation to special operating conditions, for example when the air-powder mixture supply hose between injector and coating gun is very long.

Normally, the spring 26 may be a simple helical spring exhibiting a linear characteristic. It is also possible, however, to use a spring exhibiting a progressive characteristic whereby it is then possible to achieve a still more precise automatic follow-up of the metering air with respect to the conveying air (follow-up of characteristics).

The following numerical example is merely given for a better understanding of the invention, in which it is assumed that the first threshold level of the conveying air pressure at which the valve 24 starts its closing movement is between 0.5 and 1.5 bar, and that the second threshold level at which the valve 24 is completely closed is between 2.5 and 3.5 bar.

Of course, the illustrated embodiment of the invention may be modified in various ways which are intended to be included within the scope of the present invention. This applies particularly to the design of the metering valve 24 and the provision of the branch passageways 19 and 20 within the housing. In the preferred embodiment, it is important that two branch passageways for metering air are provided of which one has a flow passage that is variable in dependence on the pressure of conveying air.

Although the present invention has been described with reference to a specific embodiment, those of skill in the art will recognize that changes may be made thereto without departing from the scope and spirit of the invention as set forth in the appended claims.

I claim as my invention:

1. A powder injector for forming a powder-air mixture and feeding said mixture to a powder coating gun, the powder injector comprising a powder suction conduit, an injector inserted in said powder suction conduit, a venturi chamber connected thereto, said venturi chamber being provided downstream of said injector, a conveying air supply conduit having a control valve therein for feeding conveying air at a pressure to said injector nozzle, and a metering air supply conduit for feeding metering air to metering air ports opening into said venturi chamber, comprising the improvement that:

the metering air supply conduit is divided into two parallel metering air branch passageways, a first branch passageway and a second branch passageway, each branching off from the conveying air supply conduit at a location downstream of the conveying air control valve and opening into a common supply conduit to the metering air ports, and wherein flow-restricting orifice means for restricting air flow is inserted in one of said branch passageways, and wherein the second branch passageway has a metering air control valve disposed therein for controlling a flow cross section thereof, said metering air control valve being actuated by the pressure prevailing in the conveying air supply conduit downstream of said conveying air control valve.

2. The powder injector as claimed in claim 1, wherein the metering air control valve comprises a movable valve plunger for controlling the flow cross section in said second branch passageway, said plunger in one direction of movement thereof being biased by a spring and in another direction of movement thereof being influenced by the pressure prevailing in the conveying air supply conduit.

3. The powder injector as claimed in claim 2, wherein said orifice means is inserted in said first branch passageway and wherein an end face of said valve plunger of the metering air control valve projects into said first branch passageway upstream of the orifice means thereof.

4. The powder injector as claimed in claim 3, wherein a stroke of said valve plunger of the metering air control valve is adjustable by a regulating screw.

5. The powder injector as claimed in claim 3, wherein the spring of the metering air control valve exhibits a progressive characteristic.

6. A powder injector for forming a powder-air mixture and feeding said mixture to a powder coating gun, said powder injector comprising:

a powder suction conduit;

an injector nozzle inserted in said powder suction conduit;

a mixing cone with a venturi tube connected thereto, said mixing cone being provided downstream of said injector nozzle;

a conveying air supply conduit having a control valve therein for feeding conveying air at a pressure to said injector nozzle; and a metering air supply conduit for feeding metering air to metering air ports opening said metering air supply conduit into said venturi tube, the metering air supply conduit having a portion of a flow path defined thereby divided into two parallel metering air branch passageways, a first branch passageway and a second branch passageway, said portion being located in the flow path downstream of the conveying air control valve and flow connected to the metering air ports, and wherein one of the branch passageways has a metering air control valve disposed therein for controlling a flow cross section thereof of said one branch passageway, said metering air control valve being actuated by the pressure prevailing in the conveying air supply conduit downstream of said conveying air control valve.

7. The powder injector as claimed in claim 6, wherein the metering air control valve comprises a movable valve plunger for controlling the flow cross section in said one branch passageway, said plunger in one direction of movement thereof being biased by a spring and in another direction of movement thereof being influenced by the pressure prevailing in the conveying air supply conduit.

8. The powder injector as claimed in claim 7, wherein another of the branch passageways comprises an orifice means for restricting air flow disposed therein and wherein an end face of said valve plunger of the metering air control valve projects into said other branch passageway upstream of the orifice means thereof.

9. The powder injector as claimed in claim 8, wherein a stroke of said valve plunger of the metering air control valve is adjustable by a regulating screw.

10. The powder injector as claimed in claim 8, wherein the spring of the metering air control valve exhibits a progressive characteristic.

11. The powder injector as claimed in claim 6, wherein each of said branch passageways comprises an orifice means for restricting air flow disposed respectively therein.

12. A powder injector for forming a powder-air mixture and feeding said mixture to a powder coating gun, said powder injector comprising:

a body member;

a powder suction conduit formed in said body member;

an injector nozzle inserted in said powder suction conduit;

a mixing cone with a venturi tube connected thereto, said mixing cone being provided downstream of said injector nozzle;

a conveying air supply conduit formed in said body and having a control valve therein for feeding conveying air at a pressure to said injector nozzle; and a metering air supply conduit for feeding metering air to metering air ports opening into said venturi tube, the metering air supply conduit being divided into two parallel metering air branch passageways, a first branch passageway and a second branch passageway, each branching off from the conveying air supply conduit at a location downstream of the conveying air control valve and opening into a common supply conduit to the metering air ports, and wherein one of the branch passageways has a metering air control valve disposed therein for controlling a flow cross section of said one branch passageway, said metering air control valve being actuated by the pressure prevailing in the conveying air supply conduit downstream of said conveying air control valve.

13. The powder injector as claimed in claim 12, wherein said first branch passageway comprises an orifice restriction upstream of said common supply conduit, and said second branch passageway comprises a second orifice restriction upstream of said metering air control valve.

14. The powder injector as claimed in claim 12, wherein said conveying air supply conduit and said common supply conduit comprise parallel straight bores through said body and said first and second branch passageways are arranged bridging said parallel bores, and perpendicular to said parallel bores.

15. The powder injector as claimed in claim 14, wherein said conveying air supply conduit and said common supply conduit each has a check valve disposed therein.

16. The powder injector as claimed in claim 14 comprising a control valve bore arranged between said conveying air supply conduit and said common supply conduit and parallel thereto, said control valve bore intersecting said first and second branch passageways; and wherein the metering air control valve comprises a valve plunger slidably residing within said control valve bore and movable to block flow between said second branch passageway of the metering air supply conduit and said control valve bore, said metering air control valve comprising a spring biasing said plunger to a flow open position through said second branch passageway, said plunger having an end cap having an end face exposed to said first branch passageway and closing said first branch passageway from said control valve bore, said end cap being slidable upward by pressure in said first branch passageway, against a bias force of said spring, to position said plunger to close said second branch passageway, partially or completely.

17. The powder injector as claimed in claim 16, wherein said second branch passageway comprises a first segment between said conveying air supply conduit and said control valve bore, and a second segment between said control valve bore and said common supply conduit, said first segment and said second segment being offset in an axial direction of said control valve bore, and said control valve bore provides a valve outlet port in alignment with said second segment and said plunger provides an annular inlet groove alignable to said first segment.

18. A method for regulating conveying air and metering air in a powder injector for forming a powder-air mixture and feeding said mixture to a powder coating gun, the powder injector having a powder suction conduit having an air injector nozzle inserted therein, the injector nozzle receiving conveying air from a conveying air supply at a conveying air pressure to draw powder from a powder supply through the powder suction conduit, and a venturi tube downstream of said injector nozzle, the venturi tube having metering air ports for receiving metering air into the venturi tube interior from a metering air supply, comprising the steps:

controlling a flow of the conveying air into the injector nozzle by regulating the conveying air pressure which is upstream of the injector nozzle, according to a powder demand;

controlling a flow of metering air into the metering air ports by supplying regulated conveying air as the metering air supply;

splitting the flow of metering air into two branches upstream of the metering air ports; and controlling flow in one of the branches with a control valve closeable by increasing conveying air pressure.

19. The method according to claim 18, wherein the step of controlling flow in one branch is further characterized in that the control valve starts a closing movement when the regulated conveying air pressure is between 0.5 and 1.5 bar and is completely closed at a regulated conveying air pressure between 2.5 and 3.5 bar.

20. The method according to claim 18, wherein the step of splitting the flow of metering air into two branches is further characterized in that another of the branches is arranged for generally nonvariable flow resistance.

* * * * *